US012780751B2

(12) United States Patent

Ishikawa

(10) Patent No.: US 12,780,751 B2

(45) Date of Patent: Nov. 3, 2026

(54) FILM-COATED MEMBER AND PLASMA PROCESSING APPARATUS INCLUDING FILM-COATED MEMBER

(71) Applicant: KYOCERA Corporation, Kyoto (JP)

(72) Inventor: Kazuhiro Ishikawa, Ryuo-cho (JP)

(73) Assignee: KYOCERA Corporatin, Kyoto (JP)

( * ) Notice: Subject to any disclaimer, the term of this patent is extended or adjusted under 35 U.S.C. 154(b) by 597 days.

(21) Appl. No.: 18/284,510

(22) PCT Filed: Mar. 28, 2022

(86) PCT No.: PCT/JP2022/015110

§ 371 (c)(1),
(2) Date: Jun. 10, 2024

(87) PCT Pub. No.: WO2022/210575

PCT Pub. Date: Oct. 6, 2022

(65) Prior Publication Data

US 2024/0343657 A1 Oct. 17, 2024

(30) Foreign Application Priority Data

Mar. 31, 2021 (JP) ................................ 2021-060856

(51) Int. Cl.

| | |
|---|---|
| ***C04B 41/87*** | (2006.01) |
| ***C04B 35/111*** | (2006.01) |
| ***C04B 41/45*** | (2006.01) |

(52) U.S. Cl.

CPC ............ *C04B 41/87* (2013.01); *C04B 35/111* (2013.01); *C04B 41/4529* (2013.01); *C04B 2235/3206* (2013.01); *C04B 2235/3217* (2013.01); *C04B 2235/3418* (2013.01); *C04B 2235/9646* (2013.01)

(58) Field of Classification Search

None

See application file for complete search history.

(56) References Cited

U.S. PATENT DOCUMENTS

| | | | | |
|---|---|---|---|---|
| 2018/0127319 | A1* | 5/2018 | Ashizawa ............... C04B 41/87 | |
| 2019/0276368 | A1* | 9/2019 | Iwasawa ............. H10P 72/7616 | |
| 2020/0165715 | A1 | 5/2020 | Hino et al. | |
| 2020/0402773 | A1* | 12/2020 | Ishikawa ................. C04B 35/10 | |
| 2021/0020415 | A1 | 1/2021 | Ishikawa et al. | |
| 2021/0118686 | A1 | 4/2021 | Ishikawa et al. | |

FOREIGN PATENT DOCUMENTS

| | | | |
|---|---|---|---|
| JP | 8-165167 | A | 6/1996 |
| JP | 2006-118053 | A | 5/2006 |
| WO | 2019/026818 | A1 | 2/2019 |
| WO | 2019/194247 | A1 | 10/2019 |
| WO | 2019/194248 | A1 | 10/2019 |

* cited by examiner

*Primary Examiner* — David Sample

(74) *Attorney, Agent, or Firm* — Procopio, Cory Hargreaves & Savitch LLP

(57) ABSTRACT

A film-coated member includes a substrate, and a film of an oxide, a fluoride, an oxyfluoride, or a nitride of a rare earth element on at least a part of the substrate. The film has a reflectance greater than 50% at a wavelength of 700 nm and less than 50% at a wavelength of 400 nm.

15 Claims, 3 Drawing Sheets

FILM-COATED MEMBER AND PLASMA PROCESSING APPARATUS INCLUDING FILM-COATED MEMBER

TECHNICAL FIELD

The present disclosure relates to a film-coated member and a plasma processing apparatus including the film-coated member.

BACKGROUND OF INVENTION

Known film-coated members are described in, for example, Patent Literatures 1 and 2.

CITATION LIST

Patent Literature

Patent Literature 1: Japanese Unexamined Patent Application Publication No. 8-165167
Patent Literature 2: Japanese Unexamined Patent Application Publication No. 2006-118053

SUMMARY

In an aspect of the present disclosure, a film-coated member includes a substrate containing ceramics, and a film of an oxide, a fluoride, an oxyfluoride, or a nitride of a rare earth element on at least a part of the substrate. The film has a reflectance greater than 50% at a wavelength of 700 nm and less than 50% at a wavelength of 400 nm.

In another aspect of the present disclosure, a plasma processing apparatus includes the film-coated member described above.

DESCRIPTION OF EMBODIMENTS

The objects, features, and advantages of the present disclosure will become more apparent from the following detailed description and the drawings.

The structure that forms the basis of a film-coated member according to one or more embodiments of the present embodiment will be described first. Alumina ceramics with high corrosion resistance, wear resistance, and specific rigidity are used as components for a semiconductor manufacturing apparatus. In preparing such alumina ceramics, trace impurities contained in an alumina raw material and unavoidable impurities introduced during the manufacturing processes may cause staining. In particular, discoloration over time may be caused by any degraded material and may lower the product value.

In response to the above, for example, Patent Literature 1 describes a method for irradiating a sintered alumina body with light or electromagnetic waves such as visible rays, ultraviolet rays, X rays, and γ rays for heat treatment in an oxygen atmosphere.

As a component for a semiconductor manufacturing apparatus used in a plasma atmosphere, for example, Patent Literature 2 describes a component for a semiconductor manufacturing apparatus including a substrate with a thermal spray coating of yttrium oxide ($Y_2O_3$) that is usually white, similarly to aluminum oxide ($Al_2O_3$). Aluminum (Al) and yttrium (Y) as metallic elements both have an extra high chemical affinity with oxygen and do not lose oxygen in a high-temperature plasma environment. $Al_2O_3$ and $Y_2O_3$ thus retain their properties as powder materials after being a thermal spray coating.

A sintered alumina body described in Patent Literature 1 has insufficient corrosion resistance to plasma (plasma resistance) and thus cannot be used in a plasma environment over a long period of time. For a sintered alumina body having a high reflectance for ultraviolet rays, ultraviolet rays applied to or reflected from the surface of the sintered alumina body may enter nearby members that thus may degrade faster.

For a sintered alumina body having a low reflectance for infrared rays, the temperature increases on the film surface, causing reaction products or deposits from plasma to easily float on the film surface. More reaction products (deposits) floating and adhering to a processing target substrate in a semiconductor wafer may easily cause defects in the processing target substrate.

The film-coated member according to one or more embodiments of the present disclosure will now be described in detail with reference to the drawings.

Figure 1A:
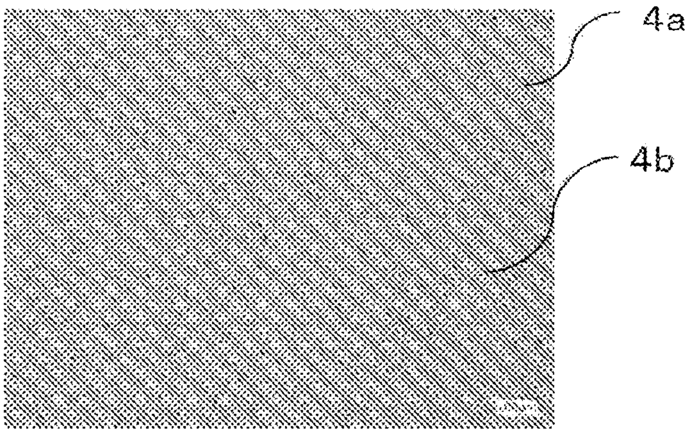
FIG. 1A is a micrograph of a film in a film-coated member according to an embodiment of the present disclosure taken by an optical microscope, illustrating its surface to be exposed to plasma.
Figure 1B:
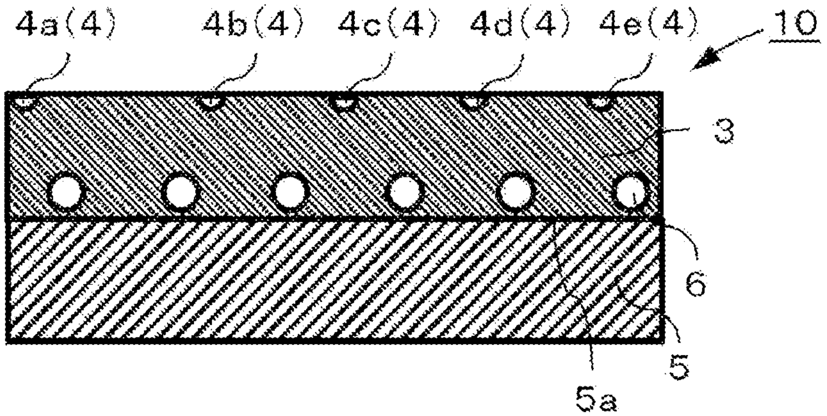
FIG. 1B is a cross-sectional view of a substrate with its upper surface coated with the film.
Figure 1C:
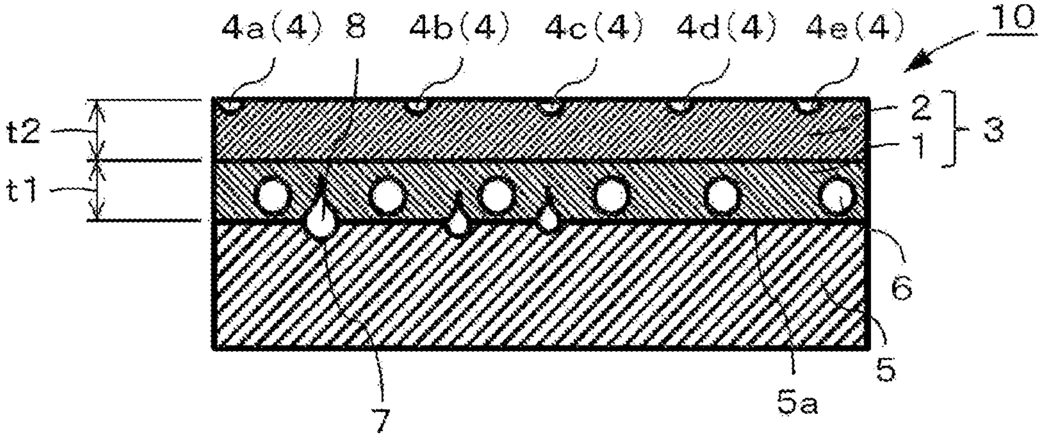
FIG. 1C is a cross-sectional view of a substrate including the film with a first layer (lower layer) on the substrate and a second layer (upper layer) on the first layer (lower layer).

In one or more embodiments of the present disclosure, a film-coated member 10 includes a substrate 5 made of ceramics and a film 3 of an oxide, a fluoride, an oxyfluoride, or a nitride of a rare earth element on at least a part of the substrate 5 as illustrated in FIGS. 1A to 1C. In an example illustrated in FIG. 1B, the substrate 5 includes a surface 5*a* coated with the film 3. In another example illustrated in FIG. 1C, a film 3 includes a first layer (lower layer) 1 on the substrate 5 and a second layer (upper layer) 2 on the first layer (lower layer) 1. A ratio t1:t2 of a thickness t1 of the first layer 1 to a thickness t2 of the second layer 2 is, for example, 4:6 to 6:4. The film 3 has a reflectance greater than 50% at a wavelength of 700 nm and less than 50% at a wavelength of 400 nm. A film 3 in another embodiment may have a reflectance greater than or equal to 67% at a wavelength of 700 nm and less than or equal to 45% at a wavelength of 400 nm.

The correlation coefficient of a curve obtained by a binary approximation or a logarithmic approximation of a curve indicating the relationship between the wavelength at every 20 nm interval in a wavelength range of 400 to 700 nm and the reflectance of the film 3 may be greater than or equal to 0.94. This correlation coefficient indicates significance when a significance level of a test is 0.1%, and indicates that the positive correlation is extremely high and the reflectance increases substantially upward to the right as the wavelength increases until the increase slows down around a wavelength of 740 nm. This reduces uneven colors in the film 3. In particular, the correlation coefficient may be greater than or equal to 0.96.

A natural logarithm is used for a logarithmic approximation of the relationship between the wavelength at every 20 nm interval in a wavelength range of 400 to 700 nm and the reflectance.

The reflectance of the film 3 may increase gradually from a wavelength of 400 nm to a wavelength of 700 nm. The reflectance increasing gradually, or more specifically, increasing relatively monotonically, is less likely to cause uneven colors than the reflectance increasing upward to the right while amplifying.

The substrate 5 may include an uncoated area uncoated with the film 3 and with a reflectance, at a wavelength of 400 nm, less than or equal to 0.9 times the reflectance at a wavelength of 700 nm. This structure increases the absorptivity of ultraviolet rays on the surface of the uncoated area and reduces incidence of ultraviolet rays on nearby members that can thus degrade less with ultraviolet rays.

The film 3 in the above embodiment has a reflectance greater than 50% at a wavelength of 700 nm and less than 50% at a wavelength of 400 nm. A film 3 in another embodiment may have a reflectance greater than or equal to 67% at a wavelength of 700 nm and less than or equal to 45% at a wavelength of 400 nm.

The reflectance at a wavelength of 400 to 700 nm may be determined using a spectrocolorimeter (NF777 by NIPPON DENSHOKU INDUSTRIES CO., LTD. or its later version) under measurement conditions such as CIE standard illuminant D65 as a light source and a viewing angle set to 2°. For calculating the above correlation coefficient, the number of samples of wavelengths as independent variables is 16, and the degree of freedom is 15.

In one or more embodiments of the present disclosure, the film-coated member 10 increases plasma resistance and the absorptivity of ultraviolet rays on the surface of the film 3, and reduces incidence of ultraviolet rays on nearby members that can thus degrade less with ultraviolet rays.

In the film-coated member 10 according to one or more embodiments of the present disclosure, heat rays (infrared rays) applied toward the surface of the film 3 in the plasma space are mostly reflected to reduce the temperature rise of the film surface and the floating of reaction products (deposits) from plasma on the film surface.

In one or more embodiments of the present disclosure, the film-coated member 10 increases the absorptivity of ultraviolet rays on the surface of the uncoated area and reduces incidence of ultraviolet rays on nearby members that can thus degrade less with ultraviolet rays.

The surface of the film 3 in the film-coated member 10 according to the present embodiment and the back surface of the substrate 5 opposite to the film 3 may have a color difference ΔE*ab greater than or equal to 15. The color difference ΔE*ab greater than or equal to 15 allows the disappearance of the film 3 caused by plasma to be visually observed to easily determine the appropriate replacement time of the film-coated member 10.

The color difference ΔE*ab is expressed by Formula (A) below and is a numerical value indicating the color difference between two points to be measured in the CIE 1976 L*a*b* color space. The two points in one or more embodiments of the present disclosure are the surface of the film 3 and the back surface of the substrate 5.

$$\Delta E^{*}ab = \left((\Delta L^{*})^2 + (\Delta a^{*})^2 + (\Delta b^{*})^2\right)^{1/2} \quad \text{(A)}$$

where ΔL* is the difference in psychometric lightness L* between the two points, Δa* is the difference in psychometric chroma coordinates a* between the two points, and Δb* is the difference in psychometric chroma coordinates b* between the two points.

The values of the psychometric lightness L* and the psychometric chroma coordinates a* and b* may be obtained in accordance with JIS Z 8722:2009. For example, the spectrocolorimeter (NF777 by NIPPON DENSHOKU INDUSTRIES CO., LTD. or its latest later version) may be used under measurement conditions such as CIE standard illuminant D65 as a light source and a viewing angle set to 2°.

In one or more embodiments of the present disclosure, when the film-coated member 10 is used in an environment involving repeated temperature rises and falls, the surface shrinks and expands without anisotropy. The film-coated member 10 can thus be used over a long period of time.

For the film-coated member 10, the film 3 to be exposed to plasma has a compressive stress σ11 across the surface and a compressive stress σ22 across the surface in the direction perpendicular to the compressive stress σ11. The ratio σ22/σ11 is less than or equal to 5.

At the ratio σ22/σ11 within the above range, the surface shrinks and expands without anisotropy in use in an environment involving repeated temperature rises and falls. This structure allows a longer period of use.

In particular, the ratio σ22/all may be 0.1 to 1.5 inclusive or 1.1 to 1.4 inclusive.

The compressive stress σ11 and the compressive stress σ22 may have an arithmetic mean of 200 to 1000 MPa inclusive. The film 3 having the arithmetic mean greater than or equal to 200 MPa maintains hardness and thus can release fewer particles upon receiving impact from floating particles in a plasma processing apparatus. Thus, the plasma processing apparatus is less likely to be contaminated with such particles. The film 3 having the arithmetic mean less than or equal to 1000 MPa withstands internal tensile stress in the above environment. Thus, the film 3 is less likely to break.

Each of the compressive stress σ11 and the compressive stress σ22 may have a coefficient of variation being less than or equal to 0.5. The film 3 having the coefficient of variation less than or equal to 0.5 is less likely to detach from the substrate 5, with less local strain occurring during use in the above environment.

In particular, the coefficient of variation may be less than or equal to 0.3.

The values of the compressive stress σ11 and the compressive stress σ22 may be measured with a 2D method using an X-ray diffractometer. The resulting values may be used to calculate the ratio σ22/σ11, the arithmetic mean, and the coefficient of variation.

The surface of the film 3 to be exposed to plasma (the upper surface in FIGS. 1B and 1C, hereafter simply referred to as the surface) has an arithmetic mean roughness Ra of 0.01 to 0.1 μm inclusive. The surface also includes multiple pores 4.

FIG. 1A illustrates the structure with multiple pores 4*a*, 4*b*, . . . . The surface of the film 3 to be exposed to plasma includes a surface portion newly exposed in response to the film 3 being thinner after plasma exposure. The film 3 internally includes multiple closed pores 6.

The arithmetic mean roughness Ra may be measured in accordance with JIS B 0601-2013. More specifically, the arithmetic mean roughness Ra may be measured with a surface roughness measuring instrument (Surfcorder) SE500 (Kosaka Laboratory Ltd.), with the probe radius of 5 μm, the measurement length of 2.5 mm, and the cutoff value of 0.8 mm.

FIGS. 1B and 1C illustrate the film 3 clearly for ease of explanation, but do not illustrate the exact correlation between the thicknesses of the substrate 5 and the film 3.

The film 3 is a film of an oxide, a fluoride, an oxyfluoride, or a nitride of a rare earth element (an oxide, a fluoride, an oxyfluoride, and a nitride are hereafter collectively referred to as compounds). Examples of the rare earth element include yttrium (Y), cerium (Ce), samarium (Sm), gadolinium (Gd), dysprosium (Dy), erbium (Er), and ytterbium (Yb). The rare earth element being yttrium has high corrosion resistance and is less expensive than other rare earth elements and is thus cost effective.

The yttrium compound may have, for example, the composition with the chemical formula $Y_2O_{3-x}$ ($0 \le x \le 1$), $YF_3$, YOF, $Y_5O_4F_7$, $Y_5O_6F_7$, $Y_6O_5F_8$, $Y_7O_6F_9$, $Y_{17}O_{14}F_{23}$, or YN. The elements of the film 3 may be identified with a thin film X-ray diffractometer.

The film 3 may contain, in addition to a compound of a rare earth element, other elements such as fluorine (F), sodium (Na), magnesium (Mg), aluminum (Al), silicon (Si), phosphorus (P), sulfur (S), chlorine (Cl), potassium (K), calcium (Ca), titanium (Ti), chromium (Cr), manganese (Mn), iron (Fe), cobalt (Co), nickel (Ni), copper (Cu), zinc (Zn), and strontium (Sr), depending on the purity of a target for forming the film 3 and the configuration of a device used.

The substrate 5 may be made of, for example, quartz, a light-transmissive ceramic material, aluminum having a purity greater than or equal to 99.999% (5N), an aluminum alloy such as aluminum 6061 alloy, an aluminum nitride ceramic material, or an aluminum oxide ceramic material. An aluminum oxide ceramic material has an aluminum oxide content greater than or equal to 90 mass % of the total mass (100%) of the elements contained in the substrate 5. The content of aluminum oxide is the value obtained by converting Al to $Al_2O_3$. The same applies to an aluminum nitride ceramic material.

The aluminum oxide ceramic material may contain magnesium oxide, calcium oxide, silicon oxide, and other elements in addition to aluminum oxide. The substrate 5 made of quartz or a light-transmissive ceramic material has a content less than or equal to 0.01 ppm by mass of each of lithium (Li), K, Na, Cr, Fe, Co, Ni, and Cu. The light-transmissive ceramic material mainly contains, for example, aluminum oxide or yttrium aluminum complex oxide.

The film 3 includes the multiple pores 4, for which a value A indicating a difference between an average of circular equivalent diameters of the pores 4 and an average of distances between the centroids of neighboring pores 4 is 28 to 48 μm inclusive.

The value A being 28 to 48 μm inclusive indicates fewer, smaller pores 4 being dispersed. The film-coated member 10 with the above structure thus produces fewer particles inside the pores 4. In addition, the pores 4 are dispersed sufficiently to prevent microcracks originating from any pores 4 nearby from extending, thus causing fewer particles from extended microcracks.

In the film-coated member 10 according to one or more embodiments of the present disclosure, the film 3 may include the multiple pores 4 constituting 1.5 to 6% inclusive of its total area. The pores 4 constituting 1.5 to 6% inclusive of the total area can prevent extension of any microcracks on the surface exposed to plasma (including a surface portion newly exposed in response to the film being thinner after plasma exposure), thus allowing the film 3 to have fewer particles resulting from microcracks. The area ratio of the pores 4 on the surface exposed to plasma is low, with fewer particles produced inside the pores 4.

In the film-coated member 10 according to one or more embodiments of the present disclosure, the film 3 may include the pores 4 with an average sphericity greater than or equal to 60%. With the sphericity of the pores 4 within this range, residual stress is less likely to accumulate around the pores 4. The film 3 exposed to plasma is thus less likely to have particles around the pores 4.

The sphericity of the pores 4 herein refers to the ratio defined by a graphite area method and is defined by Formula 1 below.

$$\text{Sphericity of a pore (\%)} = \{(\text{actual area of pore})/(\text{area of smallest circumscribed circle of pore})\} \times 100 \tag{1}$$

In particular, the average sphericity of the pores 4 may be greater than or equal to 62%.

The average of distances between the centroids of the pores 4, the average of circular equivalent diameters of the pores 4, the area ratio, and the sphericity can be determined as described below.

The surface of the film 3 is first observed with a digital microscope at a magnification of 100×. An observation image captured with a CCD camera across an area of, for example, 7.68 mm$^2$ (with a lateral length of 3.2 mm and a vertical length of 2.4 mm) is analyzed. The average of distances between the centroids of the pores 4 can be obtained through dispersion measurement with image analysis software A-Zou Kun (ver. 2.52) (registered trademark, Asahi Kasei Engineering Corporation).

Using the same observation image as described above, the average of circular equivalent diameters of the pores 4, the area ratio, and the sphericity can be obtained through particle analysis with the image analysis software A-Zou Kun.

The setting conditions for dispersion measurement and particle analysis may include the threshold indicating the brightness of an image set to 140, the brightness set to dark, the small object removal area set to 1 μm$^2$, and the noise reduction filter set to use. Although the threshold is set to 140 in the above measurement setting, the threshold may be adjusted depending on the brightness of the observation image. With the brightness set to dark, the binarization method set to manual, the small object removal area set to 1 μm$^2$, and the noise reduction filter set to use, the threshold may be adjusted to cause the marked areas on the observation image to match the shapes of the pores 4.

In the film-coated member 10 according to one or more embodiments of the present disclosure, the kurtosis Ku of circular equivalent diameters of the pores 4 on the film 3 may be 0.5 to 2 inclusive. When the kurtosis Ku of circular equivalent diameters of the pores 4 is within this range, the distribution of circular equivalent diameters of the pores 4 is narrower, and fewer pores 4 have abnormally large circular equivalent diameters. This reduces microcrack extension, produces fewer particles inside the pores 4, and increases plasma resistance. The film 3 with the above structure may be polished, after deposition, with less uneven abrasion and can have intended surface profiles with minimum polishing. In particular, the kurtosis Ku may be 1.3 to 1.9 inclusive.

Kurtosis Ku is an indicator (statistic) of differences in the peak and tails of a distribution from those of a normal distribution. The kurtosis Ku being $Ku>0$ indicates that the distribution has a sharper peak with longer and wider tails, $Ku=0$ indicates a normal distribution, and $Ku<0$ indicates a distribution having a rounded peak with shorter and narrower tails. The kurtosis Ku of circular equivalent diameters of the pores 4 can be obtained using the function Kurt available with Excel (registered trademark by Microsoft Corporation).

In the film-coated member 10 according to one or more embodiments of the present disclosure, the skewness Sk of circular equivalent diameters of the pores 4 on the film 3 may be 3 to 5.6 inclusive. When the skewness Sk of circular equivalent diameters of the pores 4 is within this range, the average of circular equivalent diameters of the pores 4 is smaller, and fewer pores 4 have abnormally large circular equivalent diameters. This reduces microcrack extension, produces fewer particles inside the pores 4, and increases plasma resistance. The film 3 with the above structure may be polished, after deposition, with less uneven abrasion and can have intended surface profiles with minimum polishing. In particular, the skewness Sk may be 3.2 to 5.3 inclusive.

Skewness Sk is an indicator (statistic) of the degree of a skewed distribution from a normal distribution, or the symmetry of the distribution. The skewness Sk being $Sk>0$ indicates the tail of the distribution extending to the right, $Sk=0$ indicates a symmetrical distribution, and $Sk<0$ indicates the tail of the distribution extending to the left. The skewness Sk of circular equivalent diameters of the pores 4 can be obtained using the function SKEW available with Excel (registered trademark by Microsoft Corporation).

The relative density of the film 3 may be greater than or equal to 98%, or more specifically, greater than or equal to 99%. The film 3 with the relative density within this range is dense and produces fewer particles when being exposed to plasma and becoming thinner. The relative density of the film 3 may be determined by obtaining its actual density with X-ray reflectometry (XRR) using a thin-film X-ray diffractometer and calculating the ratio of the actual density to the theoretical density.

The film 3 includes voids 8 extending in the thickness direction from recesses 7 on the surface of the substrate 5 facing the film 3. The voids 8 may have closed tips inside the film 3. The recesses 7 are pores or void areas on the surface of the substrate 5 facing the film 3. The recesses 7 are on the surface of the substrate 5 before the film 3 is formed.

The film 3 with the voids 8 can undergo repeated temperature rises and falls with less residual stress accumulating. The voids 8 are not connected to the outside, and particles remain in the voids 8 without being out of the film 3.

In the thickness direction of the film 3 in a cross section, each void 8 may be narrower in its part nearer the surface of the film 3 than in its part nearer the recess 7 on the substrate 5. Compared with a void 8 wider in its part nearer the surface of the film 3 than in its part nearer the recess 7 on the substrate 5, this structure can cause fewer particles in the voids 8 to be out of the film 3, when any voids 8 are open at their tips after the film 3 is exposed to plasma and becomes thinner.

A method for manufacturing the film-coated member according to one or more embodiments of the present disclosure will now be described.

A method for manufacturing the substrate will be described first.

An aluminum oxide ($Al_2O_3$) powder A with a mean particle size of 0.4 to 0.6 μm and an aluminum oxide powder B with a mean particle size of about 1.2 to 1.8 μm are prepared. A silicon oxide ($SiO_2$) powder as a Si source and a calcium carbonate ($CaCO_3$) powder as a Ca source are prepared. The silicon oxide powder is a fine powder with a mean particle size of smaller than or equal to 0.5 m. To obtain an alumina ceramic material containing Mg, a magnesium hydroxide powder is used. Hereafter, powders other than the aluminum oxide powder A and the aluminum oxide powder B are collectively referred to as first subelement powders.

A predetermined amount of each first subelement powder is weighed out. Subsequently, the aluminum oxide powder A and the aluminum oxide powder B are weighed to have a mass ratio of 40:60 to 60:40 to obtain an aluminum oxide powder mixture. The mixture is prepared to form an alumina ceramic material with an $Al_2O_3$ (converted from Al) content greater than or equal to 99.4 mass % of the total mass (100%) of the elements contained in the alumina ceramic material. To prepare the first subelement powders, the amount of Na in the aluminum oxide powder mixture may be determined first. The amount of Na is then converted to $Na_2O$ to form an alumina ceramic material. The first subelement powders are weighed to have the ratio less than or equal to 1.1 as the ratio of the converted $Na_2O$ value to a value of oxides resulting from converting the elements contained in the first subelement powders (in this example, Si and Ca) to oxides.

With respect to a total of 100 parts by mass of the alumina powder mixture and the first subelement powders, 1 to 1.5 parts by mass of a binder such as polyvinyl alcohol (PVA), 100 parts by mass of a solvent, and 0.1 to 0.55 parts by mass of a dispersant are placed into a stirrer together. These are then mixed and stirred to obtain slurry.

The slurry is spray-granulated, and the resulting granules are molded with, for example, a powder press molding device or a hydrostatic press molding device into a predetermined shape, which is cut as appropriate into a plate-like molded body.

The resulting molded body is then fired at a firing temperature of 1500 to 1700° C. inclusive for 4 to 6 hours inclusive. The surface of the resultant body on which the film is to be formed is then polished with diamond abrasive grains having a mean grain size of 1 to 5 μm inclusive and an abrasive disc of tin. This completes the substrate.

Figure 2:
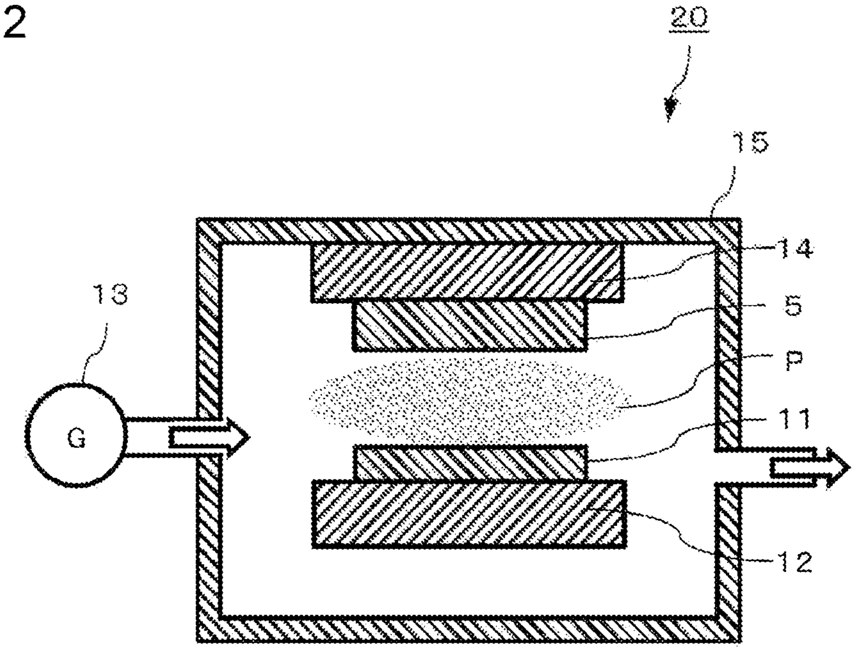
FIG. 2 is a schematic diagram of a sputtering apparatus for forming the film-coated member according to the embodiment of the present disclosure.
Figure 3:
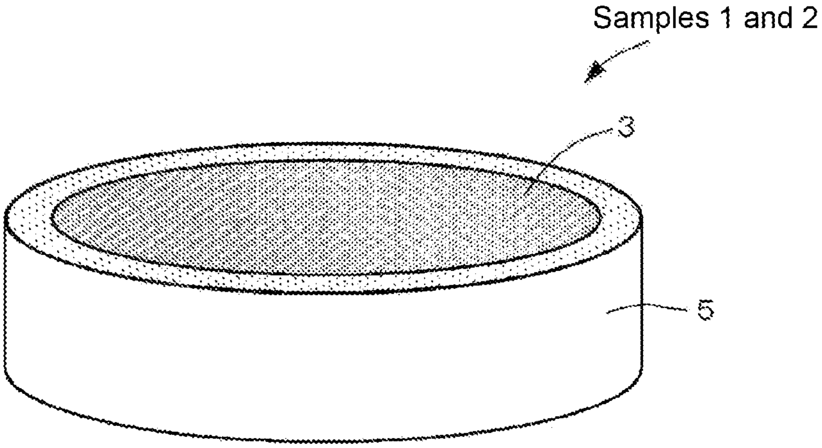
FIG. 3 is an external perspective view of samples 1 and 2 with a film 3 upward.
Figure 4:
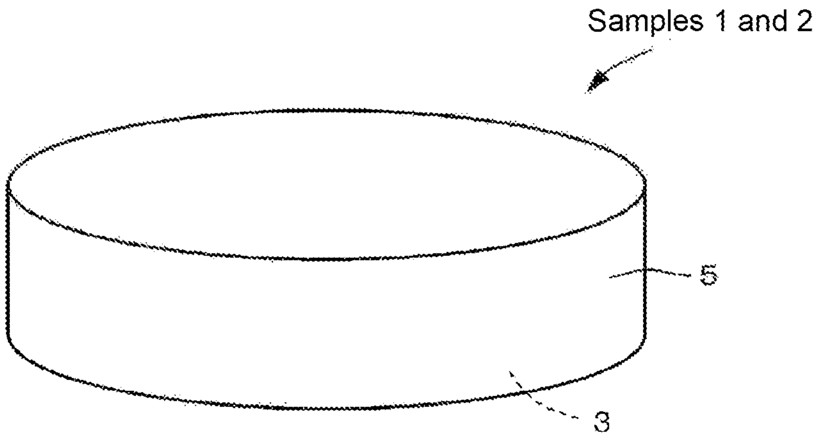
FIG. 4 is an external perspective view of the samples 1 and 2 with the film 3 downward.

A method for forming the film will now be described with reference to FIG. 2. FIG. 2 is a schematic diagram of a sputtering apparatus 20. The sputtering apparatus coefficient includes a chamber 15, a gas supply source 13 connected to the chamber 15, an anode 14 and a cathode 12 located in the chamber 15, and a target 11 connected adjacent to the cathode 12.

To form the film, the substrate 5 obtained by the method described above is placed adjacent to the anode 14 in the chamber 15. At the opposite position in the chamber 15, the target 11 made mainly of a rare earth element, yttrium metal in this example, is placed adjacent to the cathode 12. The chamber 15 is then decompressed using a vacuum pump, and argon and oxygen are supplied as a gas G from the gas supply source 13. The pressure of an argon gas to be supplied is 0.1 to 2 Pa inclusive, and the pressure of an oxygen gas is 1 to 5 Pa inclusive.

The film-coated member 10 having the arithmetic mean of the compressive stress σ11 and the compressive stress σ22 of 200 to 1000 MPa inclusive may be obtained by using an argon gas supplied at a pressure of 0.1 to 1 Pa inclusive and an oxygen gas at a pressure of 1 to 5 Pa inclusive.

The film-coated member 10 with the coefficient of variation of each of the compressive stress σ11 and the compressive stress σ22 being less than or equal to 0.5 may be obtained by using an argon gas supplied at a pressure of 0.1 to 0.5 Pa inclusive and an oxygen gas at a pressure of 1 to 5 Pa inclusive.

An electric field is then applied between the anode 14 and the cathode 12 from a power supply to generate plasma $P_1$, and a metal yttrium film is deposited on the surface of the substrate 5 by sputtering. A film with a thickness of sub-nanometers is formed per deposition. Plasma $P_2$ is then generated to oxidize the metal yttrium film. Through repeated deposition and oxidation of the metal yttrium film, the film is formed with a total thickness of 10 to 200 μm inclusive. The resultant film-coated member 10 according to one or more embodiments of the present disclosure includes a film of yttrium oxide.

The plasma $P_1$ includes a first spectrum with the highest intensity at a wavelength of 390 to 430 nm, and the other spectra (second, third, and fourth spectra in order of a higher intensity) at wavelengths of 300 to 700 nm.

In the plasma $P_2$, the first spectrum with the highest intensity has a wavelength of 500 to 550 nm, and the other spectra (second, third and fourth spectra in order of a higher intensity) at wavelengths of 380 to 820 nm.

The plasma $P_1$ and the plasma $P_2$ described above are generated to obtain a film-coated member including a film with a reflectance greater than 50% at a wavelength of 700 nm and less than 50% at a wavelength of 400 nm.

The film-coated member 10 including the pores with the area ratio of 1.5 to 6% inclusive may be obtained with a substrate including pores with an area ratio of 1 to 5% inclusive in the surface facing the film.

The film-coated member 10 including the pores with the average sphericity greater than or equal to 60% may be obtained with a substrate including pores with an average sphericity greater than or equal to 62% in the surface facing the film.

The film-coated member 10 including the pores with the kurtosis Ku of circular equivalent diameters of 0.5 to 2 inclusive may be obtained with a substrate including pores with a kurtosis Ku of circular equivalent diameters of 0.6 to 1.8 inclusive in the surface facing the film.

The film-coated member 10 including the pores with the skewness Sk of circular equivalent diameters of 3 to 5.6 inclusive may be obtained with a substrate including pores with a skewness Sk of circular equivalent diameters of 3.1 to 5.4 inclusive in the surface facing the film.

The film-coated member 10 including the voids with closed tips inside the film is obtained by first forming an yttrium oxide film, or a first layer, on a substrate with the method described above. The substrate with the first layer is then unloaded from a chamber, and the film surface of the first layer undergoes smoothing. The smoothing includes polishing of the film surface of the first layer with diamond abrasive grains having a mean grain size of 1 to 5 μm inclusive and an abrasive disc of tin to obtain a processed surface (polished surface).

The film-coated member 10 including the voids extending in the thickness direction from the recesses on the surface of the substrate facing the film and with closed tips inside the film may be obtained by preparing a substrate including pores with an average diameter of 1 to 8 μm inclusive in the surface facing the film and polishing the film surface of the first layer 21 to have the average diameter of pores of 0.1 to 5 μm inclusive.

When the sputtering apparatus 20 forms a film on a substrate including pores with an average diameter of 1 to 8 μm inclusive in the surface facing the film, each void is narrower in its part nearer the film surface than in its part nearer the recess on the substrate in the thickness direction of the film in a cross section. The film surface of the first layer is polished to have the average diameter of pores of 0.1 to 5 μm inclusive, and the second layer (described below) is formed to include the closed voids inside the film.

The second layer having yttrium oxide as a main component is formed on the processed surface of the first layer with the same procedure as for the first layer. This completes the film-coated member 10.

A film of yttrium fluoride may also be formed with the same process as described above except the oxidation being replaced by fluorination.

A film of yttrium oxyfluoride may be formed through repeated deposition, oxidation, and fluorination of a metal yttrium film in this order.

A film of yttrium nitride may be formed with the same process as described above except the oxidation being replaced by nitridation.

The power supply may supply either radio frequency power or direct current power.

In one or more embodiments of the present disclosure, the film-coated member 10 obtained with the procedure described above produces fewer particles both inside the pores 4 and through microcrack extension. The film-coated member 10 may be used as, for example, a window component for transmitting a radio frequency that generates plasma, a shower plate for distributing a gas for generating plasma, or a susceptor for placement of a semiconductor wafer.

Figure 5:
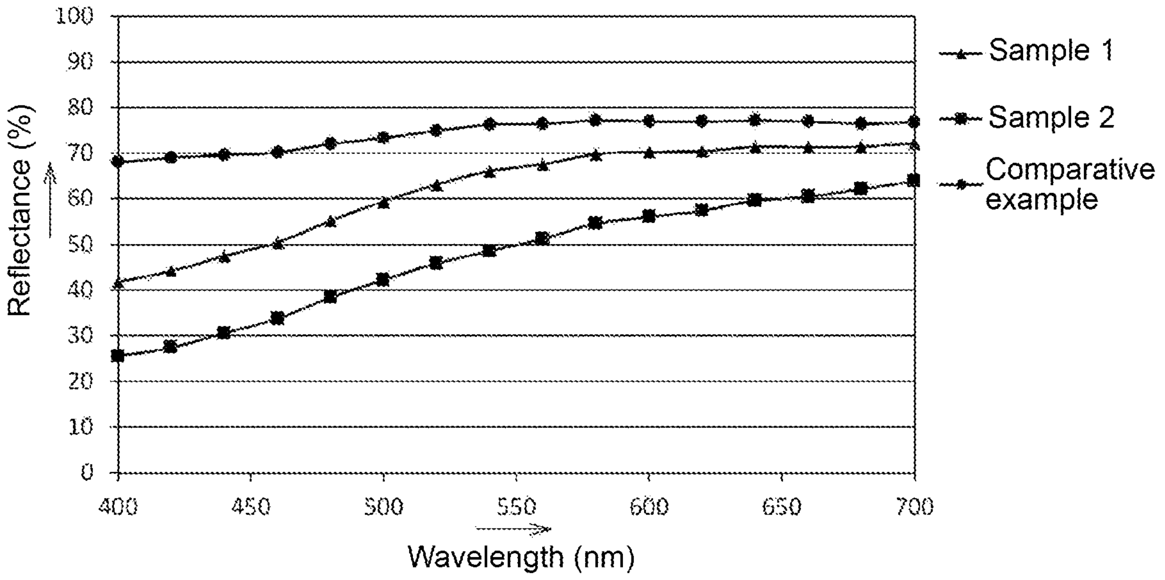
FIG. 5 is a graph showing the relationship between the wavelength and the reflectance.

To determine the reflectance of the film-coated member 10, the inventor used targets each made of yttrium with a purity of 99.7 mass % or 99.08 mass % and prepared samples 1 and 2 including a film of yttrium oxide on a part of a substrate made of an alumina ceramic material with the method described above. In a comparative example, the inventor prepared a comparative sample including a white film of yttrium oxide formed by thermal spraying on a part of a substrate made of an alumina ceramic material with the method described in an example in Patent Literature 2. The reflectance of the film 3 at wavelengths of 400 and 700 nm is determined using the spectrocolorimeter (NF777 by NIPPON DENSHOKU INDUSTRIES CO., LTD.) under measurement conditions such as CIE standard illuminant D65 as a light source and a viewing angle set to 2°. Table 1 below shows the measurement results of the reflectance. FIG. 5 is a graph showing the relationship between the wavelength and the reflectance.

TABLE 1

| | Reflectance (%) | | |
|---|---|---|---|
| Wavelength | Sample 1 | Sample 2 | Comparative example |
| 400 | 41.75 | 25.58 | 68.04 |
| 420 | 44.2 | 27.44 | 68.97 |
| 440 | 47.47 | 30.63 | 69.58 |
| 460 | 50.46 | 33.74 | 70.19 |
| 480 | 55.22 | 38.42 | 72.03 |
| 500 | 59.46 | 42.29 | 73.36 |
| 520 | 63.14 | 45.86 | 74.93 |

TABLE 1-continued

| | Reflectance (%) | | |
|---|---|---|---|
| Wavelength | Sample 1 | Sample 2 | Comparative example |
| 540 | 66.12 | 48.6 | 76.28 |
| 560 | 67.62 | 51.21 | 76.41 |
| 580 | 69.77 | 54.62 | 77.14 |
| 600 | 70.27 | 56.04 | 76.98 |
| 620 | 70.45 | 57.42 | 76.89 |
| 640 | 71.41 | 59.63 | 77.13 |
| 660 | 71.35 | 60.42 | 76.97 |
| 680 | 71.43 | 62.15 | 76.45 |
| 700 | 72.12 | 63.88 | 76.85 |

As shown in Table 1, the reflectance of the sample 1 is 41.75% at a wavelength of 400 nm and is 72.12% at a wavelength of 700 nm. The reflectance of the sample 2 is 25.58% at a wavelength of 400 nm and is 63.88% at a wavelength of 700 nm. The reflectance in the comparative example is 68.04% at a wavelength of 400 nm and is 76.85% at a wavelength of 700 nm. The results reveal that the samples 1 and 2 each include the film 3 of yttrium oxide with a reflectance greater than 50% at a wavelength of 700 nm and less than 50% at a wavelength of 400 nm, reduce the reflection of ultraviolet rays, and have characteristics of absorbing ultraviolet rays. Infrared rays are mostly reflected, thus reducing the temperature rise in the film surface and the floating of deposits near the film surface. Such results can also be obtained for a film of an oxide, a fluoride, an oxyfluoride, or a nitride of a rare earth element.

The inventor measured the lightness L* and the psychometric chroma coordinates a* and b* of the above samples 1 and 2 to determine the color tone of the film-coated member 10. The handy spectrocolorimeter NF777 (by NIPPON DENSHOKU INDUSTRIES CO., LTD.) is used for the measurement. Table 2 shows the measurement values of the lightness L* and the psychometric chroma coordinates a* and b* of the surface (film surface) of a film of yttrium oxide and the back surface of the substrate. Table 3 below shows the differences (ΔL, Δa, and Δb) in the measurement values and the color differences ΔE*ab between the surface and the back surface.

TABLE 2

| Sample | Surface (film surface) of film of yttrium oxide | | | Back surface of substrate | | |
|---|---|---|---|---|---|---|
| No. | L1* | a1* | b1* | L2* | a2* | b2* |
| Sample 1 | 83.92 | −1.88 | 15.61 | 91.87 | −0.69 | 2.68 |
| Sample 2 | 75.84 | 0.27 | 20.78 | 91.87 | −0.69 | 2.68 |

TABLE 3

| Sample No. | Δ L (L1* − L2*) | Δ a (a1* − a2*) | Δ b (b1* − b2*) | Δ E*ab |
|---|---|---|---|---|
| Sample 1 | −7.95 | −1.19 | 12.93 | 15.2 |
| Sample 2 | −16.04 | 0.96 | 18.10 | 24.2 |

In one or more embodiments of the present disclosure, the film-coated member 10 has ΔE*ab greater than or equal to 15 as shown in Table 3 to allow, when the film 3 is consumed by plasma, visual observation of the consumption, and thus the time appropriate to replace the film-coated member 10 is determined easily.

In one or more embodiments of the present disclosure, the film-coated member 10 has high strength of bonding to the substrate 5 over a long period of time.

In one or more embodiments of the present disclosure, the plasma processing apparatus is highly reliable.

The present disclosure may be embodied in various forms without departing from the spirit or the main features of the present disclosure. The embodiments described above are thus merely illustrative in all respects. The scope of the present disclosure is defined not by the description given above but by the claims. Any variations and alterations contained in the claims fall within the scope of the present disclosure.

Although embodiments of the present disclosure have been described in detail, the present disclosure is not limited to the embodiments described above, and may be changed or varied in various manners without departing from the spirit and scope of the present disclosure. The components described in the above embodiments may be entirely or partially combined as appropriate unless any contradiction arises.

REFERENCE SIGNS

1 first layer
2 second layer
3 film
4 pore
5 substrate
6 pore (closed pore)
7 recess
8 void
10 film-coated member
11 target
12 cathode
13 gas supply source
14 anode
15 chamber
20 sputtering apparatus

The invention claimed is:

1. A film-coated member, comprising:
a substrate comprising ceramics; and
a film on at least a part of the substrate, the film being formed of an oxide, a fluoride, an oxyfluoride, or a nitride of a rare earth element and having
a reflectance greater than 50% at a wavelength of 700 nm and less than 50% at a wavelength of 400 nm.

2. The film-coated member according to claim 1, wherein the film has a reflectance greater than or equal to 67% at a wavelength of 700 nm and less than or equal to 45% at a wavelength of 400 nm.

3. The film-coated member according to claim 1, wherein the substrate includes an uncoated area uncoated with the film, and
the uncoated area has, at a wavelength of 400 nm, a reflectance less than or equal to 0.9 times a reflectance at a wavelength of 700 nm.

4. The film-coated member according to claim 1, wherein the film includes a surface to be exposed to plasma, and the film has a compressive stress σ11 across the surface and a compressive stress σ22 across the surface in a direction perpendicular to the compressive stress σ11 with a ratio σ22/σ11 being less than or equal to 5.

5. The film-coated member according to claim 4, wherein the compressive stress σ11 and the compressive stress σ22 have an arithmetic mean of 200 to 1000 MPa inclusive.

6. The film-coated member according to claim 4, wherein the compressive stress σ11 and the compressive stress σ22 each has a coefficient of variation being less than or equal to 0.5.

7. The film-coated member according to claim 4, wherein the surface has an arithmetic mean roughness Ra of 0.01 to 0.1 μm inclusive, the film includes a plurality of pores in the surface, and a difference between an average of circular equivalent diameters of the plurality of pores and an average of distances between centroids of neighboring pores of the plurality of pores is 28 to 48 μm inclusive.

8. The film-coated member according to claim 7, wherein the plurality of pores has an area of 1.5 to 6% inclusive of a total area of the film.

9. The film-coated member according to claim 7, wherein the plurality of pores has an average sphericity greater than or equal to 60%.

10. The film-coated member according to claim 7, wherein the plurality of pores has a circular equivalent diameter with a kurtosis Ku of 0.5 to 2 inclusive.

11. The film-coated member according to claim 7, wherein the plurality of pores has a circular equivalent diameter with a skewness Sk of 3 to 5.6 inclusive.

12. The film-coated member according to claim 1, wherein the film includes a void extending in a thickness direction of the film from a recess on a surface of the substrate facing the film, and the void has a closed tip inside the film.

13. The film-coated member according to claim 12, wherein the void closer to a surface of the film is narrower than the void closer to the recess on the substrate when viewed in a cross-section in the thickness direction of the film.

14. The film-coated member according to claim 1, wherein the film includes a surface, the substrate includes a back surface located opposite to the film, and the surface and the back surface have a color difference ΔE*ab greater than or equal to 15.

15. A plasma processing apparatus, comprising:

the film-coated member according to claim 1.

* * * * *